(12) United States Patent
Horton et al.

(10) Patent No.: US 8,899,340 B2
(45) Date of Patent: Dec. 2, 2014

(54) PRODUCING GASEOUS HYDROCARBONS FROM HYDRATE CAPPED RESERVOIRS

(75) Inventors: Robert L. Horton, Sugar Land, TX (US); Frederick B. Growcock, Houston, TX (US)

(73) Assignee: M-I L.L.C., Houston, TX (US)

( * ) Notice: Subject to any disclaimer, the term of this patent is extended or adjusted under 35 U.S.C. 154(b) by 490 days.

(21) Appl. No.: 12/999,849

(22) PCT Filed: Jun. 16, 2009

(86) PCT No.: PCT/US2009/047472
§ 371 (c)(1),
(2), (4) Date: Dec. 17, 2010

(87) PCT Pub. No.: WO2009/155270
PCT Pub. Date: Dec. 23, 2009

(65) Prior Publication Data
US 2011/0088898 A1  Apr. 21, 2011

Related U.S. Application Data

(60) Provisional application No. 61/074,040, filed on Jun. 19, 2008.

(51) Int. Cl.
| | | |
|---|---|---|
| E21B 43/16 | (2006.01) | |
| E21B 43/14 | (2006.01) | |
| C10L 3/06 | (2006.01) | |
| C10L 3/10 | (2006.01) | |
| E21B 43/01 | (2006.01) | |

(52) U.S. Cl.
CPC .............. *E21B 43/164* (2013.01); *C10L 3/06* (2013.01); *E21B 43/14* (2013.01); *E21B 2043/0115* (2013.01); *C10L 3/108* (2013.01)
USPC ......................................... 166/402; 166/268

(58) Field of Classification Search
None
See application file for complete search history.

(56) References Cited

U.S. PATENT DOCUMENTS

| | | | |
|---|---|---|---|
| 4,007,787 A | | 2/1977 | Cottle |
| 4,042,029 A | | 8/1977 | Offeringa |
| 4,628,999 A | | 12/1986 | Kiss et al. |
| 5,261,490 A | * | 11/1993 | Ebinuma ....................... 166/266 |
| 5,413,177 A | | 5/1995 | Horton |
| 6,973,968 B2 | * | 12/2005 | Pfefferle ....................... 166/260 |
| 7,093,655 B2 | * | 8/2006 | Atkinson ....................... 166/266 |
| 7,165,621 B2 | * | 1/2007 | Ayoub et al. .................. 166/369 |
| 2003/0178195 A1 | * | 9/2003 | Agee et al. .................... 166/248 |
| 2004/0198611 A1 | * | 10/2004 | Atkinson ....................... 507/100 |
| 2004/0200618 A1 | * | 10/2004 | Piekenbrock .............. 166/305.1 |

(Continued)

OTHER PUBLICATIONS

S. Gerami, et al., "Material Balance and Boundary-Dominated Flow Models for Hydrate-Capped Gas Reservoirs," SPE 102234, 2006, 16 pages.

(Continued)

*Primary Examiner* — Angela M DiTrani
*Assistant Examiner* — Anuradha Ahuja
(74) *Attorney, Agent, or Firm* — Osha • Liang LLP

(57) ABSTRACT

A method for recovering gas from a subterranean formation having a hydrate deposit located therein and a gas reservoir located under the hydrate deposit that includes injecting a hydrate-forming fluid into an upper region of the gas reservoir neighboring the hydrate deposit; and producing gaseous hydrocarbons from a lower region of the gas reservoir is disclosed.

20 Claims, 1 Drawing Sheet

(56) References Cited

U.S. PATENT DOCUMENTS

| | | | |
|---|---|---|---|
| 2005/0121200 A1 | 6/2005 | Sivaraman | |
| 2005/0252656 A1* | 11/2005 | Maguire | 166/256 |
| 2005/0284628 A1* | 12/2005 | Pfefferle | 166/260 |
| 2006/0032637 A1* | 2/2006 | Ayoub et al. | 166/369 |
| 2006/0060356 A1* | 3/2006 | Graue et al. | 166/305.1 |
| 2009/0032248 A1* | 2/2009 | Svoboda et al. | 166/249 |

OTHER PUBLICATIONS

E.M. Reyna, et al., "Remote Arctic Drilling Operations in Russia, Case History of Ardalin Field Operations, Timan Pechora Basin," SPE 36465, 1996, pp. 491-505, 15 pages.

International Search Report issued in PCT/US2009/047472, mailed on Jan. 8, 2010, 3 pages.

Written Opinion issued in PCT/US2009/047472, mailed on Jan. 8, 2010, 3 pages.

Lee, et al., "Recovering Methane from Solid Methane Hydrate with Carbon Dioxide," Angewandte Chemie International Edition, vol. 42, pp. 5048-5051, Oct. 27, 2003, 4 pages.

Office Action issued in corresponding Australian Application No. 2009260314 dated Feb. 9, 2012 (2 pages).

Official Action with English reporting issued in corresponding Mexican Application No. MX/a/2010/014145 dated Apr. 2, 2013 (4 pages).

Office Action for Chinese Application No. 200980131961.3 dated Dec. 31, 2012, with English translation thereof (14 pages).

Official Action with English reporting issued in corresponding Mexican Application No. MX/a/2010/014145 dated Sep. 26, 2013 (7 pages).

Official Action with English reporting issued in corresponding Mexican Application No. MX/a/2010/014145 dated Mar. 26, 2014 (9 pages).

* cited by examiner

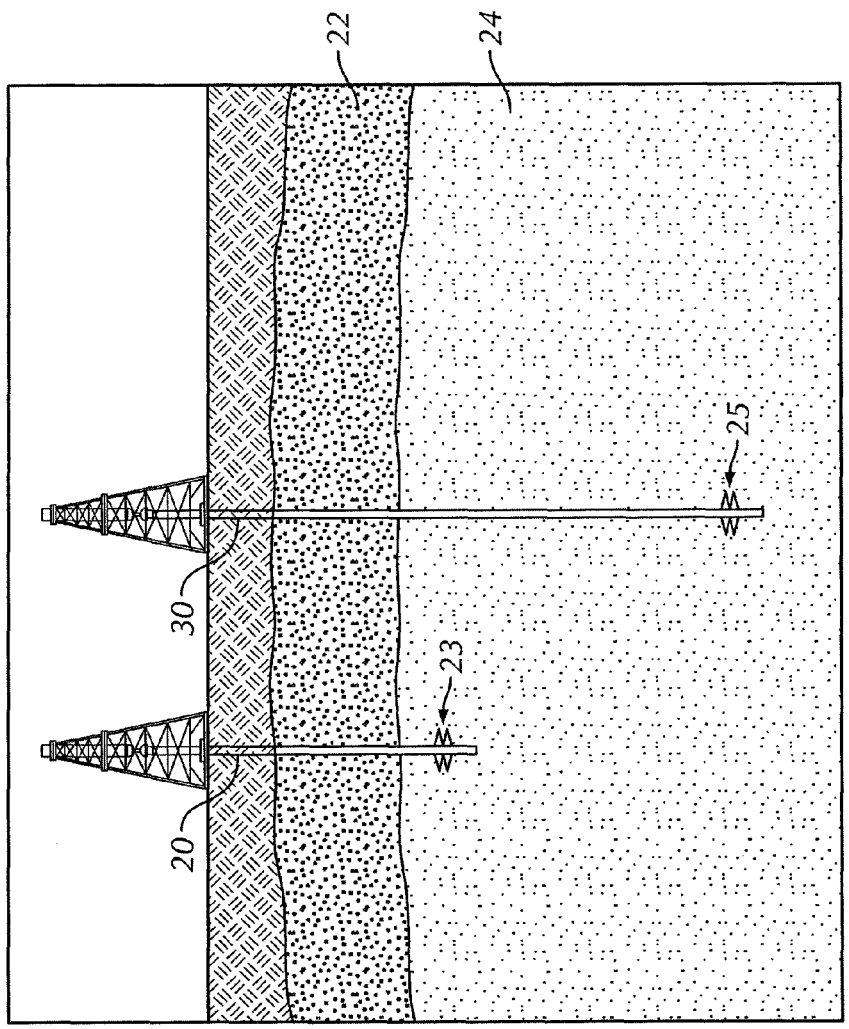
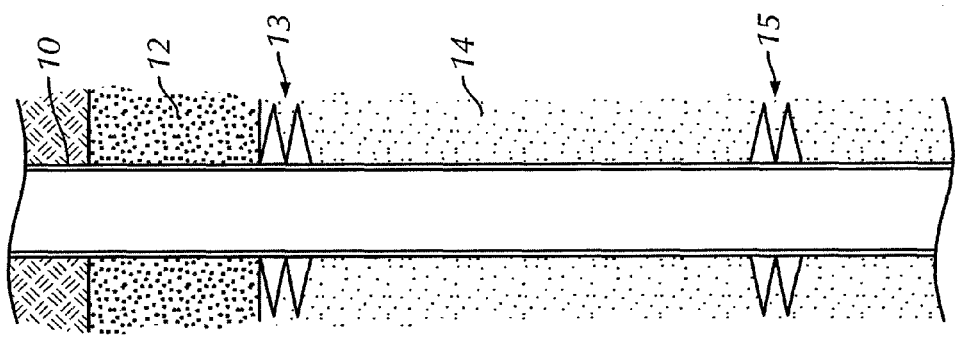
FIG. 2
FIG. 1

PRODUCING GASEOUS HYDROCARBONS FROM HYDRATE CAPPED RESERVOIRS

BACKGROUND OF INVENTION

1. Field of the Invention

Embodiments disclosed herein relate generally to the recovery of gaseous hydrocarbons. In particular, embodiments disclosed herein relate to the recovery of gaseous hydrocarbons from hydrate-capped gas reservoirs.

2. Background Art

Production of gas from subterranean oil and gas reservoirs is a well-established practice. Natural gas (primarily methane) production has for the most part been achieved through drilling wells into deep reservoirs where natural gas, frequently in association with condensate, crude oil, and water, may be trapped under a layer of cap rock. The well is lined with a casing that is cemented to the surrounding formation to provide a stable wellbore. The casing is then perforated at the reservoir level to allow gas and reservoir fluids to flow into the casing and then to the surface through tubing inside the casing.

After entering the casing via the perforations, the gas enters the tubing string(s) where it flows to the surface, through valves, and to a pipeline. The cased well method facilitates control of the flow of gas from a high-pressure reservoir and is well suited for production from porous rock or sand formation material. If the reservoir has sufficient integrity, the producing formation may not need to be stabilized with casing, and production may be initiated through various types of open-hole completions.

Gas hydrates are clathrates (inclusion compounds) in which small hydrocarbon molecules (as well as $CO_2$, $H_2S$, and $N_2$) are trapped in a lattice consisting of water molecules. Frozen water particles form an expanded crystalline structure that traps methane, or other particles. Gas hydrates form exothermically as a consequence of the tendency of water to reorient in the presence of a non-polar solute (typically light hydrocarbon gases such as methane) to stabilize the lattice through, typically, van der Waals interactions while maintaining the hydrogen bonding between the water molecules. Tetra-hydrofuran, p-dioxane, $CO_2$, and $H_2S$, to name a few other compounds, in addition to the low-molecular-weight hydrocarbons are capable of occupying the interior positions in a clathrate lattice of water molecules and stabilizing the overall structure so that it does not decompose until a relatively substantial increase in temperature or decrease in pressure occurs or both occur.

Methane hydrates form at elevated pressures and at temperatures much higher than the freezing point of water. They can be stable over broad ranges of pressure and temperature. Methane hydrates are stable at combinations of temperature and pressure found in onshore arctic regions and beneath the sea floor in water depths greater than approximately 1,500 feet (500 meters). Changes in either the temperature or the pressure can cause methane hydrates to melt and release natural gas. Methane gas may also be trapped below the hydrate layer, much as it is trapped below cap rock layers in deep underground reservoirs.

Gas hydrate encountered during drilling are a potential source of hydrocarbons for exploitation and production. Thus, the development of viable methods for the commercial production of natural gas from naturally occurring deposits of methane hydrates has been the subject of extensive research. Such techniques may include depressurization, thermal injection, and inhibitor injection. However, dissociation of hydrates can cause instability in the neighboring rock, which often is a poorly consolidated mixture of sediment and hydrate or of sediment and ice referred to as "permafrost."

In addition to the methane trapped in a gas hydrate layer, there may often be a petroliferous reservoir located beneath the hydrate layer. When producing hydrocarbons from the reservoir located below the hydrate deposit, particular attention must be paid to unintended but unavoidable reduction of pressures which may cause the hydrates to decompose, weakening the trapping layer, and creating a risk of destabilizing the wellbore, as well as the reservoir.

Accordingly, there exists a continuing need for development in production techniques for recovering hydrocarbons from hydrate-capped reservoirs.

SUMMARY OF INVENTION

In one aspect, embodiments disclosed herein relate to a method for recovering gas from a subterranean formation having a hydrate deposit located therein and a gas reservoir located under the hydrate deposit that includes injecting a hydrate-forming fluid into an upper region of the gas reservoir neighboring the hydrate deposit; and producing gaseous hydrocarbons from a lower region of the gas reservoir.

In another aspect, embodiments disclosed herein relate to a method for recovering gas from a subterranean formation having a hydrate deposit located therein and a gas reservoir located under the hydrate deposit that includes producing gaseous hydrocarbons from the gas reservoir through a wellbore penetrating the hydrate deposit and extending into the gas reservoir; injecting hydrate-forming fluid through the wellbore into an upper region of the gas reservoir neighboring the hydrate deposit; ceasing the injecting; and producing gaseous hydrocarbons through the wellbore from a lower region of the gas reservoir.

In yet another aspect, embodiments disclosed herein relate to a method for recovering gas from a subterranean formation having a hydrate deposit located therein and a gas reservoir located under the hydrate deposit that includes producing gaseous hydrocarbons from the gas reservoir through a first wellbore penetrating the hydrate deposit and extending into the gas reservoir; injecting hydrate-forming fluid into an upper region of the gas reservoir neighboring the hydrate deposit through a second wellbore; and producing gaseous hydrocarbons from a lower region of the gas reservoir through the first wellbore Other aspects and advantages of the invention will be apparent from the following description and the appended claims.

BRIEF DESCRIPTION OF DRAWINGS

FIG. 1 shows a single-well embodiment according to the present disclosure.

FIG. 2 shows a double-well embodiment according to the present disclosure.

DETAILED DESCRIPTION

In one aspect, embodiments disclosed herein relate to the recovery of gaseous hydrocarbons. More specifically, embodiments disclosed herein relate to the drilling, completion, and production of gaseous hydrocarbons from hydrate-capped gas reservoirs. As used herein, the term "gaseous hydrocarbons" refers generally to hydrocarbons that are found in a gaseous phase in downhole conditions. For example, one skilled in the art would appreciate that at surface conditions, methane, ethane, propane, and butane are all gases, but that at high temperatures and pressures experienced in some downhole environments, pentane and hexane may also be in the gas phase, and would thus be included in the gaseous hydrocarbon being produced from a reservoir. Further, the term, "gas reservoir" includes any reservoir that includes gaseous hydrocarbons trapped therein. Thus, a gas reservoir, in accordance with the present disclosure, may also include condensate or oil reservoirs in which gaseous hydrocarbons may be trapped.

Hydrocarbon recovery methods may be generally divided into two types: drive processes and cyclic processes (also referred to in the art as huff-n-puff). In drive recovery processes, injection and production of fluids are separated and occur at different wells, whereas in cyclic recovery processes, injection and production occur through the same well.

Thus, a hydrocarbon collection unit may comprise two general configurations, depending on whether a drive or cyclic recovery method is being used. For cyclic recovery, the configuration generally includes a single well extending through a hydrate deposit and into a gas, condensate, and/or oil reservoir located beneath the hydrate deposit, which is completed in at least two regions: a "lower completion" in a lower portion of the "gas cap" region of the reservoir for producing gaseous hydrocarbons therefrom, and an "upper completion" in an upper portion of the gas reservoir, preferably immediately below the hydrate-cap and above the said lower portion of the "gas cap" region of the reservoir from which gaseous hydrocarbons are produced. If the reservoir has separated into an upper gas-filled layer (the "gas cap") above a condensate- or oil-filled layer, then the lower completion could be either above or within the condensate- or oil-filled layer and below most or all of the gas-filled layer. If the reservoir has separated into an upper gas-filled layer above a water-filled layer, then the lower completion should be above the gas-water contact and low in the gas-filled layer.

The two completions in said single well should be mechanically separated so that during the "huff" cycle while carbon dioxide ($CO_2$) or other gas hydrate-forming fluid (gas or liquid) is being injected into the upper portion of the reservoir, no $CO_2$ or similar fluid is able to flow into the lower completion. Likewise, during the "puff" cycle while gas is being withdrawn through the lower completion, there should be no flow of gas from the upper completion. These mechanical separation techniques are well known to those of skill in this art.

Alternatively for a drive recovery, the configuration generally includes two wells extending through a hydrate deposit and into a gas, condensate, and/or oil reservoir located beneath the hydrate deposit, a first well completed in a lower portion of the gas reservoir (and thus likely drilled deeper than the second well) for producing gaseous hydrocarbons therefrom or even lower and in the condensate or oil rim, and a second well completed in an upper portion of the gas reservoir adjacent the hydrate deposit for injecting fluids therein to displace the produced fluids.

For a drive recovery, the configuration generally includes two wells extending through a hydrate deposit and into a gas reservoir located beneath the hydrate deposit, a first well completed in a lower portion of the gas reservoir (and thus likely drilled deeper than the second well) for producing gaseous hydrocarbons therefrom, and a second well completed in an upper portion of the gas reservoir adjacent the hydrate deposit for injecting fluids therein.

Referring to FIG. 1, a single well embodiment for use in a cyclic recovery process is shown. As shown in FIG. 1, a single wellbore 10 (typically cased, but may alternatively be openhole completed) is used to produce hydrocarbons therefrom, as well as inject carbon dioxide therein. The wellbore 10 extends through a hydrate deposit 12 and into a gas reservoir 14 located beneath (i.e., deeper than) the hydrate deposit 12. The hydrate deposit may be overlain by a permafrost layer or by deep cold water, as, for example, in the deeper portions of the Beaufort Sea, or by both permafrost and cold water. Wellbore 10 includes perforations 13 (and any other completion equipment) located in an upper region of gas reservoir 14, adjacent hydrate deposit 12, as well as perforations 15 (and any other completion techniques/equipment) located in a lower region of the reservoir 14. The wellbore 10 may be fitted with a mechanical means 11 such as a "flapper valve" or other conventional mechanical means to isolate the injection fluids from the production. One skilled in the art would appreciate that following completion of drilling of a wellbore, any completion techniques or equipment known in the art may be used, and that selection of such techniques and/or equipment would be based on conventional considerations for injection or production wells in a given formation type.

Injection of carbon dioxide or similar hydrate-forming fluids (gases or liquids) such as, for example, $H_2S$, into wellbore 10 may be controlled so that hydrate-forming liquids enter reservoir 14 through perforations 13 (termed the "upper completion"), as compared to perforations 15 (termed the "lower completion") located in a lower region of reservoir 14 (through which gas in reservoir 14 may be produced).

Injection of carbon dioxide or other similar hydrate-forming fluids may advantageously serve to maintain or even increase the hydrate layer 12, and thus reduce the risk of loss of the reservoir 14. Conventionally, depressurization of such a gas reservoir may also result in the endothermic reaction of hydrate decomposition of the hydrate layer (when the pressure at a given temperature decreases to a value below the equilibrium pressure for hydrate formation). With continued production, the depressurization would lead to continued hydrate decomposition, thinning the hydrate layer to the point where there is an increased risk of gas beneath the hydrate layer being able to escape through a thinned layer to escape to the surface, accompanied with the subsequent loss of the reservoir.

However, the injection of carbon dioxide or other hydrate-forming fluids into an upper region of the reservoir 14 adjacent the hydrate deposit 12, in accordance with the methods described herein, may alter the conventional reactions occurring downhole. In particular, the injection of carbon dioxide may react with hydrate encountered in the following exothermic reaction:

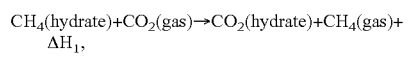

$$CH_4(hydrate)+CO_2(gas)\rightarrow CO_2(hydrate)+CH_4(gas)+\Delta H_1,$$

whereby newly formed carbon dioxide hydrate will be substituted for the decomposed methane hydrate. Thus, instead of production thinning the hydrate layer, the production coupled with carbon dioxide injection may instead maintain or even grow the hydrate layer, while also recovering the methane previously trapped within the layer. Additionally, the injection may also serve to repressurize the gas reservoir so that depletion of the reservoir will not have consequences so severe as those described above in the conventional process. Once the pressure in the reservoir stabilizes following a given injection step, gas (with little or no carbon dioxide contamination due to the injected gas being located in an upper region of the reservoir or even trapped in hydrates) may be withdrawn from a lower region of the reservoir, and the entire process may be repeated.

Now referring to FIG. 2, a two-well embodiment for use in a drive recovery process is shown. As shown in FIG. 2, a first wellbore 20 (optionally cased) is used to inject carbon dioxide therein, and a second wellbore 30 (also optionally cased) is used to produce gaseous hydrocarbons therefrom. Wellbore 20 extends through a hydrate deposit 22 and into a gas reservoir 24 located beneath (i.e., deeper than) the hydrate deposit 22. Wellbore 20 includes perforations 23 (termed the "upper completion") (and any other completion techniques/equipment) located in an upper region of gas reservoir 24, adjacent hydrate deposit 22, while wellbore 30 includes perforations 25 (termed the "lower completion") (and any other completion techniques/equipment) located in a lower region of gas reservoir 24. By using a two-well system, injection of carbon dioxide through wellbore 20 into upper region of reservoir 24 may occur at substantially the same time as production of gaseous hydrocarbons from a lower region of reservoir 24.

Similar to that described for the single well embodiment, injection of carbon dioxide into the upper region of reservoir 24 adjacent hydrate deposit 22 may allow for the reaction of carbon dioxide with methane hydrates to form stabilizing carbon dioxide hydrates, allowing for the maintenance or even growth of hydrate layer 22. Further, such displacement of methane may also increase the production levels by the amounts of methane released from hydrates as well as repressurize the reservoir.

Additionally, while this process is described as the injection and production occurring at substantially the same time, one skilled in the art would appreciate that injection and/or production may be slowed or halted as necessary to maintain desired reservoir or production conditions. Further, one skilled in the art would appreciate that while the embodiments described herein have only a single set of wells for production or injection, the present disclosure is not so limited. Thus, depending on the reservoir, one skilled in the art would appreciate that any number of injection wells, production wells, and/or single cyclic recovery wells having multiple completions therein may be used.

While some of the above description describes carbon dioxide as being the injection fluid, other hydrate-forming fluids may also be used in any of the above described embodiments. For example, in addition to $CO_2$, tetra-hydrofuran, p-dioxane, $H_2S$, as well as non-methane low-molecular-weight hydrocarbons are also capable of exothermic substitution reactions like the following:

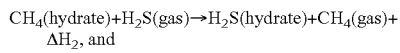

$CH_4(hydrate)+H_2S(gas) \rightarrow H_2S(hydrate)+CH_4(gas)+ \Delta H_2$, and

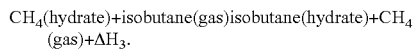

$CH_4(hydrate)+isobutane(gas) isobutane(hydrate)+CH_4(gas)+\Delta H_3$.

Of these, $CO_2$ and $H_2S$ are the most common low-value commodities available for injection. $CO_2$ has the advantage that it can be recovered from a methane-fired power generation process at the surface nearby and only the electricity need be exported to market. However, the present invention is not so limiting. Rather, any of such hydrate-forming fluids which exothermically react to form hydrates may be used.

Advantageously, embodiments of the present disclosure for at least one of the following. By using the methods described herein, stability of a hydrate-capped gas reservoir may be maintained by inducing new hydrate (carbon dioxide hydrate) formation. Such stability of the hydrate layer may be maintained despite the release of methane from the decomposition of the methane hydrates. Thus, in addition to producing addition hydrocarbons, the gas reservoir itself may have a decreased risk of loss during the course of production of gaseous hydrocarbons therefrom, as compared to conventional production where depressurization can lead to hydrate thinning and ultimate loss of the confinement of the reservoir. Additionally, the carbon dioxide injected into the reservoir may serve to sequester carbon dioxide produced from the conversion of methane to usable forms of energy or products. Thus, the generated carbon dioxide can be recycled to the injection process, augmenting it from various waste streams, and reducing the amount of carbon dioxide generated/released into the air.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method for recovering gas from a subterranean formation having a hydrate deposit located therein and a gas reservoir located under the hydrate deposit, comprising:
   injecting a hydrate-forming fluid into an upper wellbore completion located in an upper region of the gas reservoir neighboring the hydrate deposit; and
   following the injecting or simultaneous with the injecting, producing gaseous hydrocarbons from a lower wellbore completion relative to the upper wellbore completion located in a lower region of the gas reservoir.

2. The method of claim 1, wherein the injecting and the producing occur in at least two different wellbores.

3. The method of claim 2, wherein the injecting and the producing occur simultaneously.

4. The method of claim 1, wherein the injecting and the producing occur in the same wellbore.

5. The method of claim 4, wherein the injecting and the producing occur sequentially.

6. The method of claim 1, wherein the injected hydrate-forming fluid reacts with the hydrate deposit to exchange hydrocarbons trapped in the hydrate deposit with the injected hydrate-forming fluid.

7. The method of claim 1, further comprising:
   drilling at least one wellbore through the hydrate deposit and extending into the gas reservoir; and
   completing the at least one wellbore in an upper region of the gas reservoir adjacent the hydrate deposit and in a lower region of the gas reservoir.

8. The method of claim 7, wherein a first wellbore penetrating through the hydrate deposit and extending into the gas reservoir is completed in both the upper and lower regions of the gas reservoir.

9. The method of claim 7, wherein a first wellbore penetrating through the hydrate deposit and extending into the gas reservoir is completed in at least the lower region of the gas reservoir, and wherein a second wellbore at least penetrating through the hydrate deposit and extending into the gas reservoir is completed in the upper region of the gas reservoir.

10. The method of claim 1, wherein the hydrate-forming fluid comprises carbon dioxide.

11. A method for recovering gas from a subterranean formation having a hydrate deposit located therein and a gas reservoir located under the hydrate deposit, comprising:
   producing gaseous hydrocarbons from the gas reservoir through a wellbore penetrating the hydrate deposit and extending into the gas reservoir;
   after the producing, injecting hydrate-forming fluid through an upper completion in the wellbore into an upper region of the gas reservoir neighboring the hydrate deposit;
   ceasing the injecting; and after ceasing the injecting, producing gaseous hydrocarbons through the wellbore from a lower region of the gas reservoir through a lower completion relative to the upper completion.

12. The method of claim 11, wherein the injected hydrate-forming fluid reacts with the hydrate deposit to exchange hydrocarbons trapped in the hydrate deposit with the injected hydrate-forming fluid.

13. The method of claim 11, further comprising:
   drilling at least one wellbore through the hydrate deposit and extending into the gas reservoir; and
   completing the at least one wellbore in an upper region of the gas reservoir adjacent the hydrate deposit and in a lower region of the gas reservoir.

14. The method of claim 13, wherein a first wellbore penetrating through the hydrate deposit and extending into the gas reservoir is completed in both the upper and lower regions of the gas reservoir.

15. The method of claim 11, wherein the hydrate-forming fluid comprises carbon dioxide.

16. A method for recovering gas from a subterranean formation having a hydrate deposit located therein and a gas reservoir located under the hydrate deposit, comprising:
   producing gaseous hydrocarbons from the gas reservoir through a first wellbore penetrating the hydrate deposit and extending into the gas reservoir;
   injecting hydrate-forming fluid into an upper region of the gas reservoir neighboring the hydrate deposit through an upper completion in a second wellbore; and
   simultaneous with the injecting, producing gaseous hydrocarbons from a lower region of the gas reservoir through a lower completion relative to the upper completion in the first wellbore.

17. The method of claim 16, wherein the hydrate-forming fluid comprises carbon dioxide.

18. The method of claim 16, wherein the injected hydrate-forming fluid reacts with the hydrate deposit to exchange hydrocarbons trapped in the hydrate deposit with the injected hydrate-forming fluid.

19. The method of claim 16, further comprising:
   drilling at least one wellbore through the hydrate deposit and extending into the gas reservoir; and
   completing the at least one wellbore in an upper region of the gas reservoir adjacent the hydrate deposit and in a lower region of the gas reservoir.

20. The method of claim 19, wherein a first wellbore penetrating through the hydrate deposit and extending into the gas reservoir is completed in at least the lower region of the gas reservoir, and wherein a second wellbore at least penetrating through the hydrate deposit and extending into the gas reservoir is completed in the upper region of the gas reservoir.

* * * * *